(12) United States Patent
Dowling, Jr. et al.

(10) Patent No.: US 10,160,129 B2
(45) Date of Patent: Dec. 25, 2018

(54) MECHANICAL ROUGHENING PROFILE MODIFICATION

(71) Applicant: Ford Motor Company, Dearborn, MI (US)

(72) Inventors: William Edmunds Dowling, Jr., Saline, MI (US); David Alan Stephenson, Detroit, MI (US); Timothy George Beyer, Troy, MI (US)

(73) Assignee: Ford Motor Company, Dearborn, MI (US)

( * ) Notice: Subject to any disclaimer, the term of this patent is extended or adjusted under 35 U.S.C. 154(b) by 35 days.

(21) Appl. No.: 15/419,292

(22) Filed: Jan. 30, 2017

(65) Prior Publication Data

US 2018/0215058 A1   Aug. 2, 2018

(51) Int. Cl.
*F02F 3/00* (2006.01)
*B26D 3/06* (2006.01)
*F02F 1/00* (2006.01)

(52) U.S. Cl.
CPC ............... *B26D 3/06* (2013.01); *F02F 1/004* (2013.01); *F02F 2200/06* (2013.01)

(58) Field of Classification Search
CPC .......... B26D 3/06; F02F 1/004; F02F 2200/06
USPC .................................. 123/193.2; 29/888.061
See application file for complete search history.

(56) References Cited

U.S. PATENT DOCUMENTS

| 5,931,038 | A | 8/1999 | Higashi | |
|---|---|---|---|---|
| 7,000,584 | B1 * | 2/2006 | Wynveen | F02F 1/16 |
| | | | | 123/193.2 |
| 7,513,236 | B2 | 4/2009 | Miyamoto et al. | |
| 8,726,874 | B2 | 5/2014 | Whitbeck et al. | |
| 9,382,868 | B2 * | 7/2016 | Stephenson | F02F 1/00 |
| 2010/0059012 | A1 * | 3/2010 | Tachibana | F02F 1/004 |
| | | | | 123/193.2 |
| 2010/0101526 | A1 | 4/2010 | Schaefer et al. | |
| 2014/0360355 | A1 | 12/2014 | Whitbeck et al. | |
| 2014/0364042 | A1 | 12/2014 | Whitbeck et al. | |
| 2016/0097340 | A1 * | 4/2016 | Morgan | F02F 1/004 |
| | | | | 123/193.2 |
| 2018/0127861 | A1 * | 5/2018 | Li | C23C 4/073 |

FOREIGN PATENT DOCUMENTS

| DE | 102009008741 A1 | 8/2010 |
|---|---|---|
| DE | 102010052735 A1 | 11/2011 |

* cited by examiner

*Primary Examiner* — Marguerite McMahon
(74) *Attorney, Agent, or Firm* — Marta Johnston; Brooks Kushman P.C.

(57) ABSTRACT

Tools and methods for forming modified mechanical roughening profiles are disclosed. In at least one embodiment, an engine block is provided including a body defining a cylinder bore having a bore surface. The bore surface may have defined therein a plurality of grooves extending from the bore surface and each groove may have a base and a top portion. The top portion may have opposing chamfered edges. The chamfered edges may be formed by a tool including at least one cutting element having triangular teeth and at least one cutting element having rectangular teeth. In another embodiment, a tool including at least one cutting element having curved teeth and at least one cutting element having rectangular teeth may be used to form grooves having a curved/radiused edge surface. The disclosed roughening profiles may reduce oxide growth when a coating is applied to the bore surface.

8 Claims, 6 Drawing Sheets

MECHANICAL ROUGHENING PROFILE MODIFICATION

TECHNICAL FIELD

The present disclosure relates to tools and methods for mechanical roughening profile modification, for example, in engine bores.

BACKGROUND

Engine blocks (cylinder blocks) may include one or more cylinder bores that house pistons of an internal combustion engine. Engine blocks may be cast, for example, from cast iron or aluminum. Aluminum is lighter than cast iron, and may be chosen in order to reduce the weight of a vehicle and improve fuel economy. Aluminum engine blocks may include a liner, such as an aluminum or cast iron liner. Aluminum liners may be cast-in to the engine block. Aluminum engine blocks that are liner-less or that have cast-in aluminum liners may include a coating on the bore surface. The coating (e.g., a steel-based, thermally sprayed coating) may reduce wear and/or friction.

Mechanical roughening may be used to prepare the surface of the engine bore to receive the coating so that the adhesion between the coating and substrate is sufficient to withstand manufacturing and operating loads. For example, a series of square grooves may be cut into the substrate using a side cutting end mill. After the grooves are formed, the tops may be deformed with a swiper (e.g., a rotary swage-wiper) to produce an undercut. The resulting profile may have dovetail-shaped peaks with sharp corners, which can lead to oxidation.

SUMMARY

In at least one embodiment, an engine block is provided. The engine block may include a body defining a cylinder bore having a bore surface, the bore surface having defined therein a plurality of grooves extending from the bore surface; and each groove having a base and a top portion, the top portion having opposing chamfered edges.

The chamfered edges may form an included angle with a top or side of the groove that is obtuse. In one embodiment, the included angle is at least 110 degrees. In another embodiment, the top portion of the groove may have only obtuse included angles. The chamfered edges may have a chamfer angle of 20 to 70 degrees or 30 to 60 degrees. In one embodiment, each of the chamfered edges may have a chamfer length that is at most ⅓ of a maximum groove peak width. The top portion may be wider than the base portion such that the groove forms an undercut with the bore surface.

In at least one embodiment, an interpolated roughening cutting tool is provided. The tool may include a body having at least first and second cutting elements coupled thereto; the first cutting element including rectangular cutting teeth; and the second cutting element including non-rectangular cutting teeth; wherein the first and second cutting elements are configured to create grooves in a surface that have a top portion with blunt edge surfaces.

In one embodiment, the second cutting element includes triangular cutting teeth and the first and second cutting elements are configured to create grooves with chamfered edges. The rectangular cutting teeth may be configured to create groove sides that are substantially perpendicular to the surface and the triangular cutting teeth may be configured to create chamfered edges. In one embodiment, the first and second cutting elements are configured to create grooves with chamfered edges having a chamfer angle of 20 to 70 degrees. In another embodiment, the first and second cutting elements are configured to create grooves with chamfered edges each having a chamfer length that is at most ⅓ of a maximum groove peak width. In another embodiment, the second cutting element may include curved cutting teeth having a peak and two concave sides extending therefrom. The rectangular cutting teeth may be configured to create groove sides that are substantially perpendicular to the surface and the curved cutting teeth may be configured to create rounded edges.

The tool may also include third, fourth, fifth, and sixth cutting elements. The third cutting element may include rectangular cutting teeth offset from the cutting teeth of the first cutting element, the fourth cutting element may include non-rectangular cutting teeth offset from the cutting teeth of the second cutting element, and the fifth and sixth cutting elements may each include a substantially flat cutting surface. In one embodiment, the first, second, third, fourth, fifth, and sixth cutting elements are equally spaced around the body, the first and third cutting elements are adjacent to each other, and the second and fourth cutting elements are adjacent to each other.

In at least one embodiment, a method is provided. The method may include roughening a bore surface by interpolating a cutting tool having a first cutting element including rectangular cutting teeth and a second cutting element including non-rectangular cutting teeth; and the first and second cutting elements cutting grooves in the bore surface that have a top portion with blunt edge surfaces.

In one embodiment, the non-rectangular cutting teeth are triangular cutting teeth and the first and second cutting elements cut grooves in the bore surface that have a top portion with opposing chamfered edges. The method may further include deforming the grooves having a top portion with opposing chamfered edges to reduce a height of the grooves and generate an undercut relative to the bore surface, wherein the grooves retain the opposing chamfered edges after being deformed. In another embodiment, the non-rectangular cutting teeth are curved cutting teeth having a peak and two concave sides extending therefrom and the first and second cutting elements cut grooves in the bore surface that have a top portion with rounded edges.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
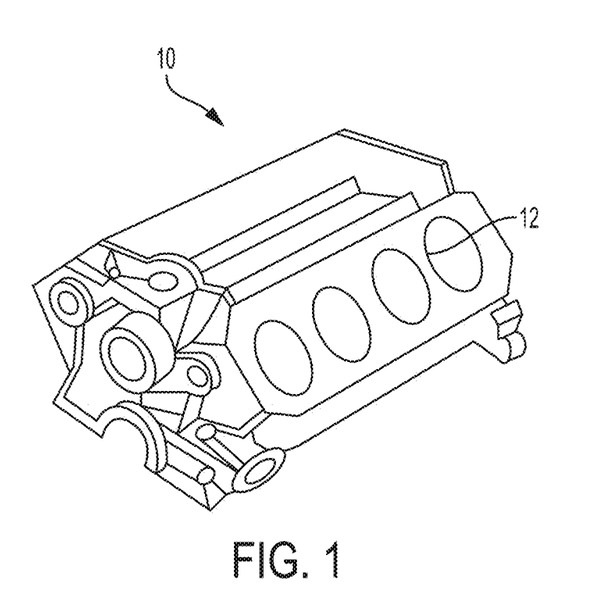
FIG. 1 is a schematic perspective view of an engine block.
Figure 2:
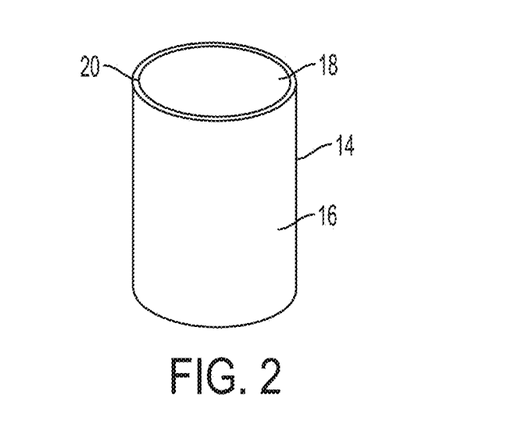
FIG. 2 is a perspective view of a cylinder liner, according to an embodiment.

With reference to FIG. 1, an engine or cylinder block 10 is shown. The engine block 10 may include one or more cylinder bores 12, which may be configured to house pistons of an internal combustion engine. The engine block body may be formed of any suitable material, such as aluminum, cast iron, magnesium, or alloys thereof. In at least one embodiment, the engine block 10 is a liner-less engine block. In these embodiments, the bores 12 may have a coating thereon. In at least one embodiment, the engine block 10 may include cylinder liners 14, such as shown in FIG. 2, inserted into or cast-in to the bores 12. The liners 14 may be a hollow cylinder or tube having an outer surface 16, an inner surface 18, and a wall thickness 20.

If the engine block parent material is aluminum, then a cast iron liner or a coating may be provided in the cylinder bores to provide the cylinder bore with increased strength, stiffness, wear resistance, or other properties. For example, a cast iron liner may cast-in to the engine block or pressed into the cylinder bores after the engine block has been formed (e.g., by casting). In another example, the aluminum cylinder bores may be liner-less but may be coated with a coating after the engine block has been formed (e.g., by casting). In another embodiment, the engine block parent material may be aluminum or magnesium and an aluminum or magnesium liner may be inserted or cast-in to the engine bores. Casting in of an aluminum liner into an aluminum engine block is described in U.S. application Ser. No. 14/972,144 filed Dec. 17, 2015, now U.S. Publication No. 2017/0175668 on Jun. 22, 2017, the disclosure of which is hereby incorporated in its entirety by reference herein.

Accordingly, the bore surface of the cylinder bores may be formed in a variety of ways and from a variety of materials. For example, the bore surface may be a cast-iron surface (e.g., from a cast iron engine block or a cast-iron liner) or an aluminum surface (e.g., from a liner-less Al block or an Al liner). The disclosed roughening process may be applied to any suitable bore surface, therefore, the term bore surface may apply to a surface of a liner-less block or to a surface of a cylinder liner or sleeve that has been disposed within the cylinder bore (e.g., by interference fit or by casting-in).

Figure 3A:
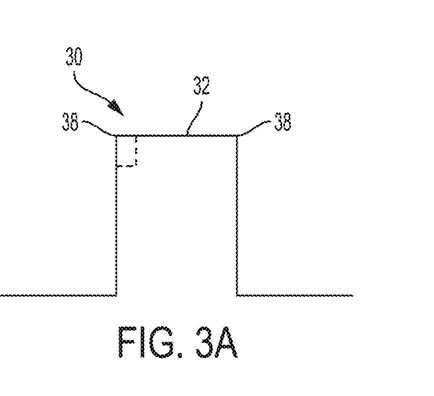
FIG. 3A is a schematic cross-section of a rectangular groove formed on a surface, according to an embodiment.
Figure 3B:
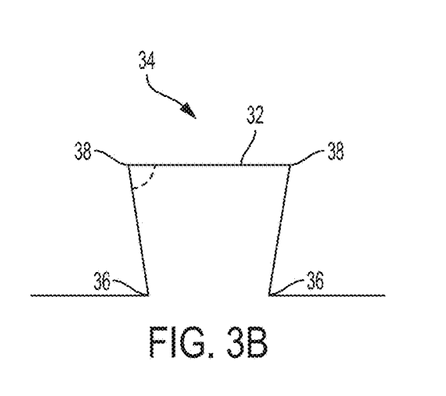
FIG. 3B is a schematic cross-section of the groove of FIG. 3A after being deformed, according to an embodiment.

With reference to FIGS. 3A and 3B, the exposed surface of the bore (e.g., Al liner or Al engine block) may be mechanically roughened prior to applying a wear-resistant coating. For example, a series of square grooves 30 may be cut into the surface using a side cutting end mill. After the grooves are formed, the tops 32 may be deformed to produce deformed grooves 34 having undercuts 36. Undercuts 36 may be defined as a reduced width of the groove at its base relative to its top surface. It may also (or alternatively) be defined as having an acute angle between the bore surface and the sides of the grooves. FIG. 3A shows a schematic example of a groove profile of a square groove 30 and FIG. 3B shows a schematic example of a groove profile of a deformed groove 34 having undercuts 36 after the top 32 is deformed. The resulting profile from the deformation may form dovetail-shaped peaks (e.g., inverted truncated triangles). In both grooves, the distal corners 38 of the grooves (e.g., corners projecting furthest into the bore) are very sharp. In the originally formed square grooves 30, the corners 38 may form a right or 90° angle (or substantially right angle, ±a few degrees). Once the grooves are deformed, the corners 38 of the deformed grooves 34 may be even sharper. For example, the angle may be acute (less than 90°), such as less than 80° or less than 70°.

Examples of this mechanical roughening process, and tools used therein, are disclosed in commonly owned U.S. Pat. No. 8,726,874, issued May 20$^{th}$, 2014; U.S. Pat. No. 9,511,467, issued Dec. 6$^{th}$, 2016; and U.S. application Ser. No. 13/913,871, filed Jun. 10$^{th}$, 2013, the disclosures of which are hereby incorporated in their entirety by reference herein. One of ordinary skill in the art will understand that, based on the present disclosure, the disclosed tools and cutting elements may be incorporated into the interpolated roughening processes disclosed in the incorporated references.

Figure 4:
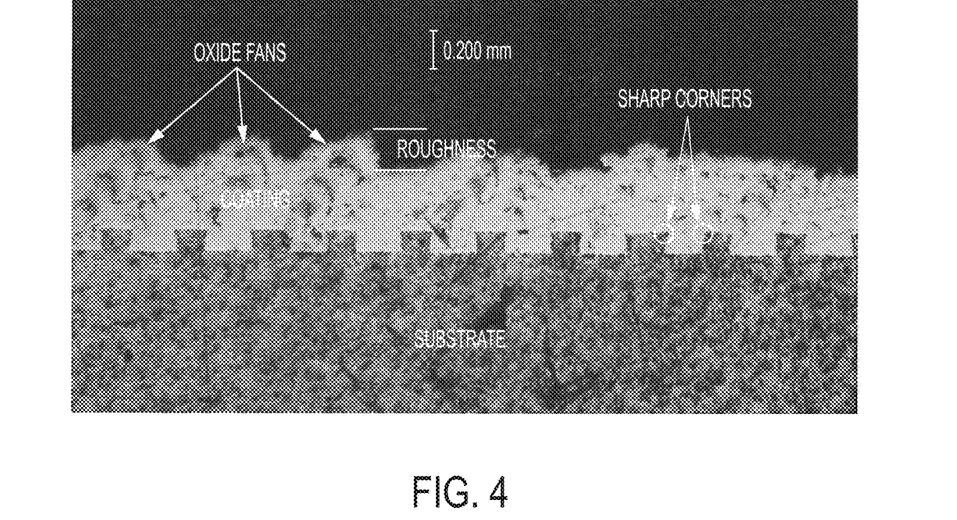
FIG. 4 is a cross-section of a bore surface having deformed rectangular grooves with a coating applied thereon.

With reference to FIG. 4, the resulting profile from deforming square grooves may form dovetail-shaped peaks (e.g., inverted truncated triangles) with sharp corners (e.g., included angle <90 deg). It has been discovered that these corners can overheat and even partially oxidize during thermal spraying. The sharp corners may then function at nucleation sites for additional oxide growth. This may result in oxide fans growing from the corners to the surface. The oxide fans are generally undesirable because they increase coated surface roughness, which may require increased coating thickness to ensure cleanup during machining. An example of this increased roughness is shown in FIG. 4. In addition, the oxide fans are weak points which can lead to coating fracture and pore formation during coating machining.

Figure 5A:
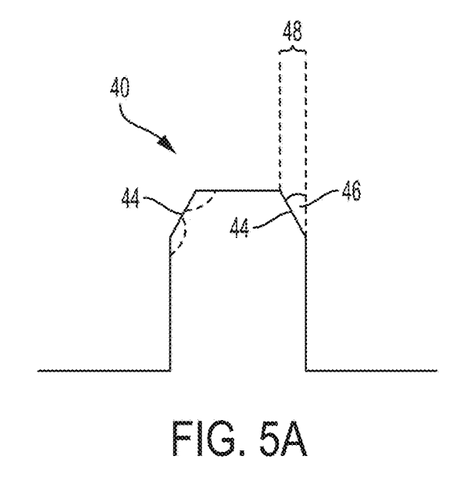
FIG. 5A is a schematic cross-section of a chamfered groove formed on a surface, according to an embodiment.
Figure 5B:
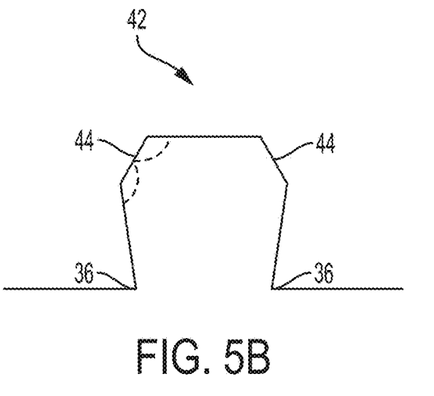
FIG. 5B is a schematic cross-section of the groove of FIG. 5A after being deformed, according to an embodiment.
Figure 6A:
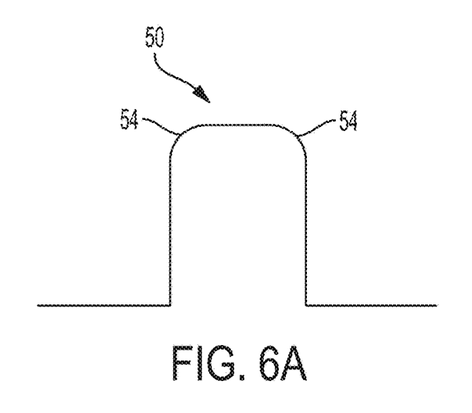
FIG. 6A is a schematic cross-section of a curved or radiused groove formed on a surface, according to an embodiment.
Figure 6B:
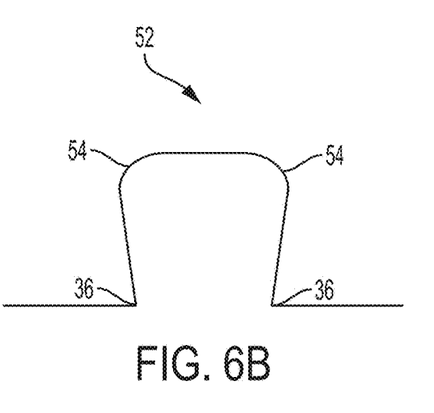
FIG. 6B is a schematic cross-section of the groove of FIG. 6A after being deformed, according to an embodiment.

With reference to FIGS. 5A-6B, examples of disclosed modified groove profiles are shown. Only a single groove is shown for illustration purposes, however, there may of course be a plurality of grooves formed on the surface of the bore (e.g., as shown in FIG. 4). The features of the grooves in FIGS. 5A-6B may be exaggerated and may not be to scale. FIGS. 5A and 6A show examples of a chamfered groove 40 and a curved or radiused groove 50, respectively, prior to deformation. FIGS. 5B and 6B show examples of a deformed chamfered groove 42 and a deformed curved or radiused groove 52. These pre-deformation groove profiles 40 and 50 may be formed by modifying the cutting tool, such as a cutting tool that forms square grooves (described in more detail, below).

It has been found that modifying the groove profile to reduce/eliminate sharp corners may reduce the number of oxide nucleation sites that form the oxide fans shown in FIG. 4. After deformation, these profiles may still produce an undercut (e.g., a restriction in the groove width which helps to retain the sprayed coating), but may not exhibit sharp corners in the top portion of the groove which can lead to oxide fanning. For example, the top portion of the deformed grooves may have included angles that are obtuse, or greater than 90°, such as at least 100°, 110°, 120°, 130°, or 135°. In one embodiment, the deformed grooves may include only obtuse included angles, which may have the above values. In at least one embodiment, the top portion may have blunt edge surfaces, which may include, for example, chamfered edges or rounded/curved edges (e.g., such as shown in FIGS. 5A-6B).

With reference to FIGS. 5A and 5B, a chamfered groove 40 may be initially cut into the bore surface and then deformed to form a deformed chamfered groove 42. Similar to deformed groove 34, the deforming the groove 40 may form undercuts 36 in the base of the deformed groove 42. The chamfered groove 40 may include two chamfered portions or edges/corners 44, one on each side of the groove 40 (e.g., in the top or distal portion of the groove). While a groove having two chamfered portions 44 is shown, in other embodiments there may be a single chamfered portion 44 (e.g., on either side).

In at least one embodiment, the chamfered portion(s) 44 may have a chamfer angle 46 and a chamfer length 48. The chamfer angle 46 may be measured from the vertical (e.g., axis perpendicular to the bore surface). In one embodiment, the chamfer angle 46 may be from 20 to 70 degrees, or any sub-range therein, such as 30 to 60 degrees, 40 to 50 degrees, or about 45 degrees (e.g., ±3 degrees). The chamfer length 48 may be measured in a direction parallel to the bore surface (horizontal direction, as shown). In one embodiment, the chamfer length 48 may less than ½ of the total width of the groove, such as at most ⅓ of the total width of the groove. For example, if the groove has a total width of 150 μm, then the chamfer length 48 may be at most 50 μm (for a ⅓ max). The above chamfer angles and lengths may refer to the groove 40 (e.g., pre-deformation) or to the groove 42 (e.g., post-deformation). If the chamfer angles and lengths refer to the pre-deformation groove, then the chamfer angles and lengths may be altered by the deformation process. For example, the chamfer angles may increase after deformation (the included angles may also increase).

In another embodiment, each corner may include two or more chamfered portions 44, for example, 2 or 3 chamfered portions 44. The multiple chamfered portions may be connected to form a double-angled surface. The total length of the multiple chamfers may be the same as the single-chamfer lengths described above (e.g., each chamfer in the multiple chamfer embodiments may be relatively short). The multiple chamfered portions may have an increasing chamfer angle 46 from the first chamfered portion (e.g., nearest the base of the groove) to the last chamfered portion (e.g., nearest the top of the groove). If there are two chamfered portions per side of the groove, then the first chamfered portion (nearest the base) may have a first chamfer angle and the second chamfered portion (nearest the top) may have a second chamfer angle that is greater than the first. For example, the first chamfer angle may be from 20 to 40 degrees and the second chamfer angle may be from 50 to 70 degrees. In one embodiment, the first chamfer angle may be about 30 degrees (e.g., ±5 degrees) and the second chamfer angle may be about 60 degrees (e.g., ±5 degrees).

With reference to FIGS. 6A and 6B, a curved or radiused groove 50 may be initially cut into the bore surface and then deformed to form a deformed curved or radiused groove 52. Similar to deformed groove 34, the deforming the groove 50 may form undercuts 36 in the deformed groove 52. The curved or radiused groove 50 may include two curved/radiused portions or corners 54, one on each side of the groove 50 (e.g., in the top or distal portion of the groove). While a groove having two curved/radiused portions 54 is shown, in other embodiments there may be a single curved/radiused portion 54 (e.g., on either side). The radius of the curved/radiused portions may be either circular or elliptical. A radius (e.g., max radius) of curvature of the corner may be between ¼ and ½ the peak width or any sub-range therein, such as ⅓ to ½, ¼ to ⅜, or ⅓ to ⁷⁄₁₆ of the peak width. For example, for a peak width of 150 μm, the radius of the curved/radiused potion 54 may be from 50 to 75 μm (⅓ to ½ the peak width).

Figure 7A:
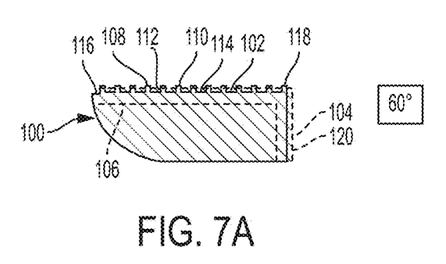
FIG. 7A is a schematic cross-section of a cutting element for an interpolated cutting tool having rectangular teeth, according to an embodiment.

With reference to FIGS. 7A-7E, cross-sectional, schematic views of cutting elements 100, 200, 300, 400, and 500 are shown. These cutting elements may all be coupled/attached to a cutting tool 700, explained in further detail below. Referring to FIG. 7A, cutting element 100 is shown having cutting surface 102, relief surface 104 and locating surface 106. The cutting surface 102 schematically includes a number of teeth 108. It should be understood that the number of teeth shown are simply exemplary. In some embodiments, the number of teeth may be 1 to 3 per millimeter of axial length. In one embodiment, the number of teeth may be about 2.5 teeth per axial length. In the embodiment shown, each tooth 108 is rectangular in shape (which may include square). Each tooth 108 has a top surface 110 and side surfaces 112. Flat valleys 114 may extend between adjacent teeth 108. Cutting element 100 may also include a chamfer 116. The chamfer 116 may have any suitable angle, such as about 15 degrees. The chamfer 116 may provide stress relief and ease of mounting of the cutting elements. The cutting elements 100-500 may be formed of any suitable material and may be removable/replaceable or may be coupled to a replaceable cartridge. In one embodiment, the cutting elements 100-500 may be brazed polycrystalline diamond elements. In other embodiments, replaceable tungsten carbide elements mounted in adjustable cartridges or replaceable rings mounted on an arbor may be used.

Figure 7B:
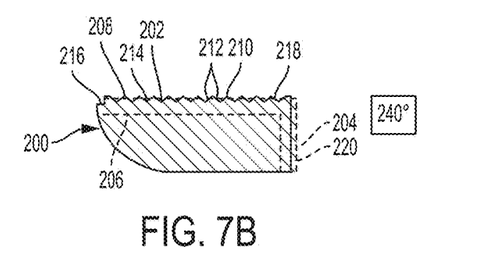
FIG. 7B is a schematic cross-section of a cutting element for an interpolated cutting tool having triangular teeth, according to an embodiment.
Figure 7C:
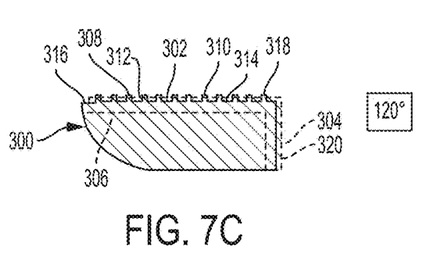
FIG. 7C is a schematic cross-section of a cutting element for an interpolated cutting tool having rectangular teeth offset from FIG. 7A, according to an embodiment.

Referring to FIG. 7C, cutting element 300 is shown having cutting surface 302, relief surface 304 and locating surface 306. The cutting surface 302 schematically includes a number of teeth 308. It should be understood that the number of teeth shown are simply exemplary. In some embodiments, the number of teeth may be 1 to 3 per millimeter of axial length. In one embodiment, the number of teeth may be about 2.5 teeth per axial length. In the embodiment shown, each tooth 308 is rectangular in shape (which may include square). Each tooth 308 has a top surface 310 and side surfaces 312. Flat valleys 314 may extend between adjacent teeth 308. Cutting element 300 may also include a chamfer 316. The chamfer 316 may have any suitable angle, such as about 15 degrees. The chamfer 316 may provide stress relief and ease of mounting of the cutting elements.

Cutting elements 100 and 300 may have similar structures and shapes. However, the arrangement of teeth and the dimensions may be different. Tooth 118, which is closest to leading edge 120, may have an outermost side wall that may be flush with relief surface 104 or offset with relief surface 104. Tooth 318, which is closest to leading edge 320, may have an outermost side wall that is offset from relief surface 304 by a greater amount than tooth 108. The offset of tooth 308 may be any suitable value, such as 400 microns. In other embodiments, the offset may be 1 to 500 microns. Accordingly, there be an offset, such as 400 microns, between the relief edge of tooth 108 and the relief edge of tooth 308. The relief surface facing side of the other teeth 108 of cutting element 100 and the relief surface facing side of the other teeth 308 of cutting element 300 may also be offset from each other. The offset of each corresponding tooth in cutting elements 100 and 300 may be the same or different. This may allow the edges to cut two separate rows of grooves, one by each offset element, with acceptable stress on the teeth.

Referring to FIG. 7B, cutting element 200 is shown having cutting surface 202, relief surface 204 and locating surface 206. The cutting surface 202 schematically includes a number of teeth 208. It should be understood that the number of teeth shown are simply exemplary. In some embodiments, the number of teeth may be 1 to 3 per millimeter of axial length. In one embodiment, the number of teeth may be about 2.5 teeth per axial length. In the embodiment shown, each tooth 208 is triangular in shape. In another embodiment, each tooth 208 may have a truncated triangle shape. In another embodiment, each tooth 208 may include two opposing sides angled inward towards each other (e.g., such as the sides of a triangle). Each tooth 208 may have a peak or a top surface 210 and side surfaces 212. A valley 214 may extend between adjacent teeth 208. Cutting element 200 may also include a chamfer 216. The chamfer 216 may have any suitable angle, such as about 15 degrees. The chamfer 216 may provide stress relief and ease of mounting of the cutting elements.

Figure 7D:
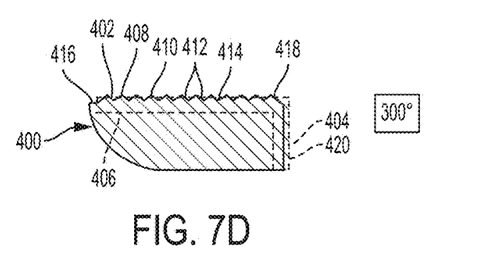
FIG. 7D is a schematic cross-section of a cutting element for an interpolated cutting tool having triangular teeth offset from FIG. 7B, according to an embodiment.

Referring to FIG. 7D, cutting element 400 is shown having cutting surface 402, relief surface 404 and locating surface 406. The cutting surface 402 schematically includes a number of teeth 408. It should be understood that the number of teeth shown are simply exemplary. In some embodiments, the number of teeth may be 1 to 3 per millimeter of axial length. In one embodiment, the number of teeth may be about 2.5 teeth per axial length. In the embodiment shown, each tooth 408 is triangular in shape. In another embodiment, each tooth 408 may have a truncated triangle shape. In another embodiment, each tooth 408 may include two opposing sides angled inward towards each other (e.g., such as the sides of a triangle). Each tooth 408 may have a peak or a top surface 410 and side surfaces 412. A valley 414 may extend between adjacent teeth 408. Cutting element 400 may also include a chamfer 416. The chamfer 416 may have any suitable angle, such as about 15 degrees. The chamfer 416 may provide stress relief and ease of mounting of the cutting elements.

Cutting elements 200 and 400 may have similar structures and shapes. However, the arrangement of teeth and the dimensions may be different. Tooth 218, which is closest to leading edge 220, may have an outermost peak or side wall that may be flush with relief surface 204 or offset with relief surface 204. Tooth 418, which is closest to leading edge 420, may have an outermost peak or side wall that is offset from relief surface 404 by a greater amount than tooth 408. The offset of tooth 408 may be any suitable value, such as 400 microns. In other embodiments, the offset may be 1 to 500 microns. Accordingly, there be an offset, such as 400 microns, between the peak of tooth 208 and the peak of tooth 408. The peaks of the other teeth 208 of cutting element 200 and the peaks of the other teeth 408 of cutting element 400 may also be offset from each other. The offset of each corresponding tooth in cutting elements 200 and 400 may be the same or different. This may allow the edges to cut two separate rows of grooves, one by each offset element, with acceptable stress on the teeth.

Figure 7E:
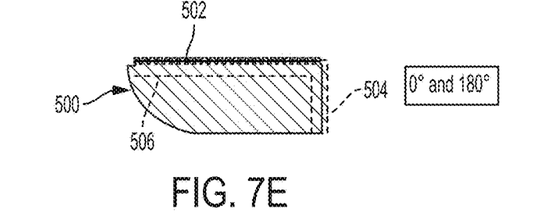
FIG. 7E is a schematic cross-section of a cutting element for an interpolated cutting tool having a flat cutting surface, according to an embodiment.

Referring to FIG. 7E, a cutting element 500 is shown having a cutting surface 502, relief surface 504 and a locating surface 506. Cutting surface 502 may be flat or generally flat, and may have no teeth, in contrast to the cutting surfaces of the other cutting elements, which are shown in phantom. The cutting element 500 may remove a portion of the peaks between the grooves and create the pocket. The amount of radial offset may control the depth of the grooves cut in the bottom of the bore pocket. In one embodiment, the depth of the grooves that are cut when the cutting elements 100-500 are used in combination may be 120 microns. However, this depth may vary from tool to tool or with different cutting elements.

Figure 8:
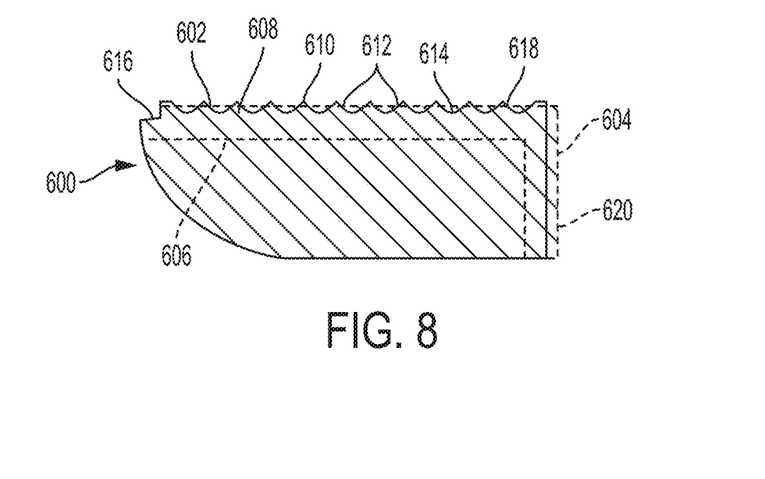
FIG. 8 is a schematic cross-section of a cutting element for an interpolated cutting tool having curved or concave teeth, according to an embodiment.

Referring to FIG. 8, cutting element 600 is shown having cutting surface 602, relief surface 604 and locating surface 606. The cutting surface 602 schematically includes a number of teeth 608. It should be understood that the number of teeth shown are simply exemplary. In some embodiments, the number of teeth may be 1 to 3 per millimeter of axial length. In one embodiment, the number of teeth may be about 2.5 teeth per axial length. Each tooth 608 may have a peak or a top surface 610 and side surfaces 612. A valley 614 may extend between adjacent teeth 608. In the embodiment shown, each tooth 608 may be generally triangular in shape, but with concave or curved sides 612. In another embodiment, each tooth 608 may include two curved opposing sides angled inward towards each other and having a concave shape. Cutting element 600 may also include a chamfer 616. The chamfer 616 may have any suitable angle, such as about 15 degrees. The chamfer 616 may provide stress relief and ease of mounting of the cutting elements.

With reference to FIGS. 7A-7E, 8, and 9, examples of the relative positions of the cutting elements 100-500 on a cutting tool 700 are shown. In the embodiment shown, there are six cutting elements, which are equally spaced apart (e.g., 60 degrees between each cutting element for a given row/set of cutting elements). However, as described above, there may be greater or fewer cutting elements. The spacing of the cutting elements may be equal regardless of their number. In one embodiment, the cutting element 500 may be positioned at 0 degrees and another cutting element 500 may be positioned at 180 degrees (e.g., opposite the first cutting element 500). As used herein, the 0 degrees position may be an arbitrarily chosen reference point and does not necessarily correspond to a certain position on the cutting tool 700.

Figure 9:
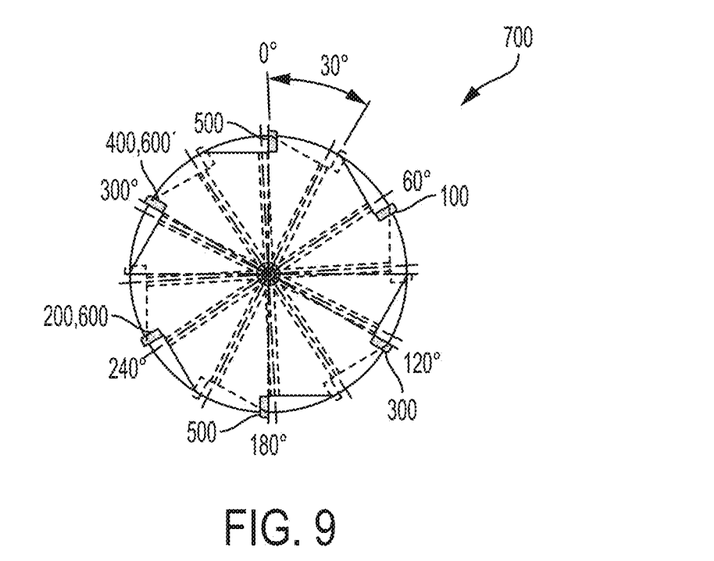
FIG. 9 is a schematic top view of a cutting tool showing a top axial row of cutting elements, according to an embodiment.

In the embodiment shown, the cutting element 100 may be positioned at 60 degrees and the cutting element 300 may be positioned at 120 degrees. Accordingly, the two cutting elements 100 and 300 having rectangular teeth may be positioned adjacent to each other on the cutting tool 700. In the embodiment shown, the cutting element 200 may be positioned at 240 degrees and the cutting element 400 may be positioned at 300 degrees. Accordingly, the two cutting elements 200 and 400 having triangular teeth may be positioned adjacent to each other on the cutting tool 700. The cutting elements 500 may be positioned such that they separate the cutting elements having rectangular teeth from the cutting elements having triangular teeth.

While the cutting elements 100-500 may be positioned in the manner shown, one of ordinary skill in the art will understand, based on the present disclosure, that other configurations may be used. For example, the positions of cutting elements 100 and 300 may be flipped with the positions of cutting elements 200 and 400 or the positions shown may be rotated by any multiple of 60 degrees. As described above and below, there may be multiple sets of cutting elements on the cutting tool 700. For example, there may be at least 2, 3, or 4 sets of cutting elements. The sets of cutting elements may be spaced along a longitudinal axis of the cutting tool 700. Each set of cutting elements may be radially offset or rotated relative to the adjacent set of cutting elements. In the embodiment shown, the sets may be rotated by 30 degrees (shown in phantom). However, the sets may be rotated by any suitable value, such as 45 degrees or 60 degrees.

In addition, the cutting elements 200 and 400 in the above description may be replaced by the cutting element 600 and a second cutting element 600' that is offset from the first. The offset may be similar to the offsets in cutting elements 100/300 and 200/400. For example, the offset cutting element 600' may include a tooth that is closest to leading edge that is offset from the relief surface by a greater amount than the closest tooth in cutting element 600. The offset may be any suitable value, such as 400 microns or 1 to 500 microns. Accordingly, there may be an offset, such as 400 microns, between the peaks of the teeth in each cutting element. This may allow the edges to cut two separate rows of grooves, one by each offset element, with acceptable stress on the teeth.

Figure 10:
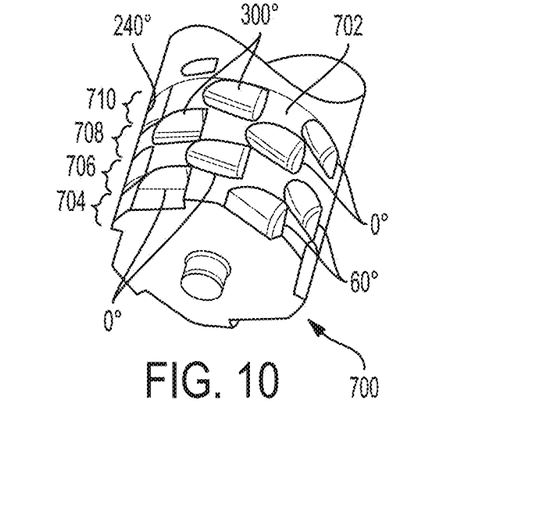
FIG. 10 is a schematic perspective view of a cutting tool, according to an embodiment.

With reference to FIG. 10, a perspective view of a cutting tool 700 is shown according to one embodiment. Cutting tool 700 may include a cylindrical body 702 and first, second, third and fourth axial rows 704, 706, 708 and 710 of cutting elements. Cylindrical body 702 may be formed of any suitable material, such as steel or cemented tungsten carbide. The cutting elements may be formed of any suitable cutting tool material, such as those suitable for machining steel, aluminum, or magnesium alloy. The considerations for selecting such materials may include, without limitation, chemical compatibility and/or hardness. Non-limiting examples of such materials may include, without limitation, high speed steel (e.g., sintered), sintered tungsten carbide, polycrystalline cubic boron nitride, or polycrystalline diamond. Each axial row 704, 706, 708 and 710 may include six cutting elements. However, while six cutting elements are shown in FIG. 10, any number of cutting elements may be used according to one or more embodiments.

As shown in FIG. 10, the six cutting elements are equally radially spaced apart from adjacent cutting elements. In other words, the six cutting elements are located at 0, 60, 120, 180, 240, and 300 degrees around the circumference of the cylindrical body 702 (e.g., as described with reference to FIG. 9). As shown in FIG. 10, and described above, the cutting elements in each row may be offset or staggered circumferentially from one another between each row, e.g., each cutting element of the 0, 60, 120, 180, 240 and 300 degree cutting elements may be staggered by 30, 45, or 60 degrees in adjacent rows. The staggering may improve the lifetime of the cutting tool by smoothing out the initial cutting of the inner surface profile. If the cutting elements are aligned between adjacent rows, more force may be necessary to initiate the cutting operation, and may cause more wear on the cutting elements or deflection and vibration of the tool.

In embodiments where the cutting tool 700 includes cutting elements 200 and 400, the cutting tool may be configured to form chamfered grooves, such as those shown in FIG. 5A. Without being held to any particular theory, it is believed that the rectangular teeth on the cutting elements 100 and 300 may cut or generate rectangular grooves in the surface (e.g., bore surface) and that the triangular teeth on cutting elements 200 and 400 may remove the corners of the rectangular grooves to form grooves having chamfered corners (e.g., grooves 40). Depending on the position of the cutting elements, the timing of the contact between the cutting elements and the bore surface, or other factors, the order of the groove formation may be different or reversed. For example, the triangular cutting elements may first form triangular grooves in the surface and then the rectangular cutting elements may cut the sides of the triangular grooves to form the perpendicular sides of the chamfered groove. The cutting elements 500 having flat or generally flat cutting surfaces and no teeth may remove a top portion of the peaks of the grooves. For example, the groove height of the groove 40 may have initially been larger, but the cutting elements 500 may remove material from the top or peak of the groove to reduce the groove height.

In embodiments where the cutting tool 700 includes cutting elements 600 and 600', the cutting tool may be configured to form curved or radiused grooves, such as those shown in FIG. 6A. Without being held to any particular theory, it is believed that the formation of the radiused grooves may be similar to that described above for the chamfered grooves, but that the triangular teeth are replaced with curved/concave teeth. Accordingly, the curved/concave teeth may clip the corners of rectangular grooves to form curved or radiused grooves or, alternatively, may create curved grooves that are then cut by rectangular teeth to have perpendicular sides.

As described above, the cutting tool 700 may have any suitable number of cutting elements. In at least one embodiment, the cutting tool 700 may include at least one cutting element having rectangular teeth and at least one cutting element having non-rectangular teeth. The cutting element(s) having rectangular teeth may be configured to form rectangular grooves in the bore surface (or other surface being roughened) or to form perpendicular sides on grooves having non-rectangular shapes (e.g., cutting perpendicular sides in to triangular grooves). The cutting element(s) having non-rectangular teeth, such as triangular teeth or concave/curved teeth, may be configured to form non-rectangular grooves in the bore surface or to form non-perpendicular sides on grooves having a rectangular shape. For example, triangular teeth may form triangular grooves or may form angled sides on a rectangular groove. Or, concave/curved teeth may form concave/curved grooves or may form curved/radiused sides on a rectangular groove. The cutting elements may have shaped, sized, and configured to form grooves having the shape and dimensions described above (e.g., chamfer angle, corner radius, etc.).

Once the cutting tool 700 has been interpolated around the bore surface (or applied to another surface), the roughened bore surface may include a plurality of non-rectangular grooves. For example, the grooves may have a chamfered shape (e.g., rectangular with the corners removed) or a curved/radiused shape. As used herein, the groove shape may refer to the cross-sectional shape of the groove extending from the bore surface towards a center of the bore. These base of these grooves may be generally perpendicular to the bore surface (e.g., at about 90 degrees). To generate an undercut in the grooves, a deformation process may be performed.

The deformation process may be performed according to the process described in incorporate Ser. No. 14/972,144, however, any deformation process that reduces the groove height and generates an undercut may be used. For example, a swiper tool (e.g., rotary swage-wiper) may be used to deform the grooves. The swiper tool may include a cylindrical shank and a plurality of swiping projections. Each swiping projection may project outward from the center of the swiper tool. The swiper tool may have the same diameter as the cutting tool, and the swiper elements may have the same axial length as the cutting elements, so that the swiping tool and the cutting tool may be run over the same tool path to simplify programming and reduce motion errors. Each swiping projection may include a relief surface, a back surface, and a rake surface. A chamfer may extend between rake surface and relief surface. The chamfer or like edge preparation, such as a hone, may be used to ensure that the tool deforms the peaks instead of cutting them. In one embodiment, the angle of the chamfer relative to the landing surface 616 may be 15 degrees. In other variations, the angle may be 10 to 20 degrees, or a hone with a radius of 25 to 100 microns. In one embodiment, the angle between the rake surface and the relief surface of adjacent swiping projections may be 110 degrees.

In at least one embodiment, the swiping tool is dull enough that it does not cut into the inner surface of the cylinder bore. Instead, the swiping tool may mechanically deform grooves formed in the inner surface of the cylinder bore. Referring to FIGS. 5A and 6B, the swiping tool, used according to the methods identified herein, may create undercuts 36 and elongate the top/upper surface of the grooves. The difference between the height of the non-deformed peak and the height of the deformed peak may be referred to as $\Delta h$. In one embodiment, $\Delta h$ may be about 10 microns, while in other embodiments, $\Delta h$ may be 5 to 60 microns. However, these are merely examples, the height difference may vary depending on the tools used, the roughening/swiping parameters, the materials of the components involved, or other factors. The undercuts formed in the grooves may increase the adhesion of a subsequent thermal spray coating onto the roughened inner surface of the cylinder bore.

Figure 11:
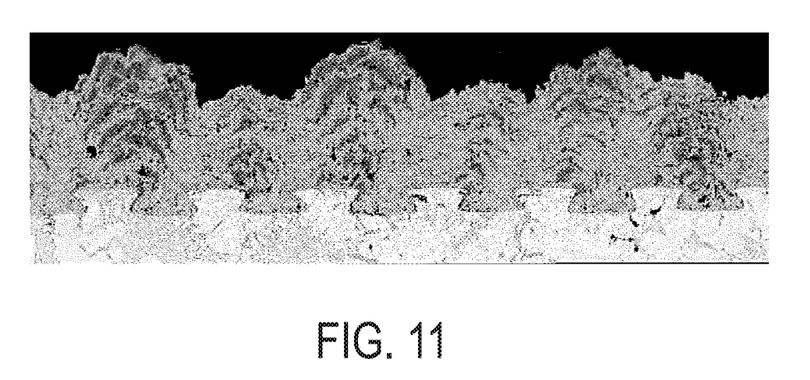
FIG. 11 is a cross-section of a bore surface having deformed rectangular grooves with a coating applied thereon.
Figure 12:
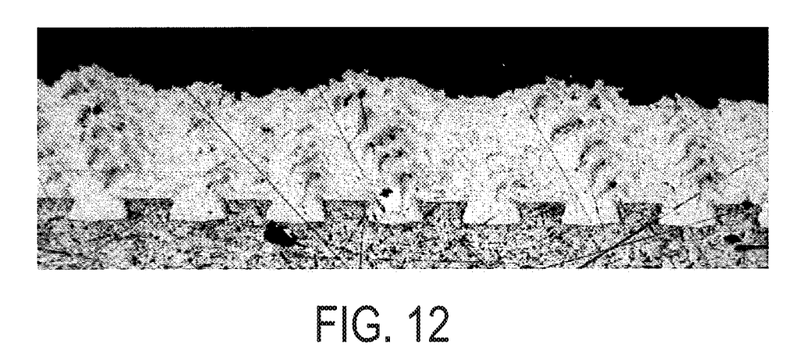
FIG. 12 is a cross-section of a bore surface having deformed chamfered grooves, according to an embodiment, with a coating applied thereon.

With reference to FIGS. 11 and 12, examples of roughened cylinder bore surfaces having thermally sprayed coatings applied thereto are shown. FIG. 11 shows a bore surface roughened according to conventional methods and using conventional rectangular-tooth tools. Accordingly, the initial grooves formed were rectangular in shape and then deformed to form grooves with undercuts, but also sharp corners (e.g., such as shown in FIGS. 3A and 3B). FIG. 12 shows a bore surface roughened according to the disclosed methods and tools, including non-rectangular-toothed tools (e.g., triangular or curved/concave). The bore surface was roughened using a milling tool similar to those disclosed in FIGS. 7A-10, including cutting elements having triangular teeth, similar to those described in FIGS. 7A-7E. The cutting tool was configured to form 45 degree chamfers on the grooves (e.g., a 30 micron swipe).

As shown in FIG. 11, the coating on the conventional bore having sharp-cornered grooves has substantial oxide growth, referred to as oxide fanning. As shown and described with reference to FIG. 4, these oxide fans may nucleate and grow from the sharp corners of the grooves after they are deformed. The fans significantly increase the surface roughness of the as-applied coating. For example, the surface roughness of the as-applied coating may be 250 microns or greater (e.g., based on maximum roughness height, $R_t$). This may require the coating to be applied with a greater initial thickness to allow for a machining operation to be performed and create a more uniform bore diameter.

As shown in FIG. 12, the coating on the bore having chamfered grooves without sharp corners has significantly less oxide growth than the coating in FIG. 11. Without being held to any particular theory, it is believed that the elimination of the sharp corners mitigates the nucleation and growth of the oxide. It has been found that the as-applied coating may have a surface roughness of at most 200, 150, or 100 microns (e.g., Rt) when the grooves are chamfered or radiused, as disclosed (e.g., with the groove shape being the only variable/difference). This may allow for a thinner coating to be initially applied, because less machining will need to be done to make the bore diameter uniform. A thinner coating may save time and costs in the production cycle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An engine block, comprising:
 a body defining a cylinder bore having a bore surface, the bore surface having defined therein a plurality of grooves extending from the bore surface; and
 each groove having a base and a top portion, the top portion having opposing chamfered edges.

2. The engine block of claim 1, wherein the chamfered edges form an included angle with a top or side of the groove that is obtuse.

3. The engine block of claim 2, wherein the included angle is at least 110 degrees.

4. The engine block of claim 2, wherein the top portion of the groove has only obtuse included angles.

5. The engine block of claim 1, wherein the chamfered edges have a chamfer angle of 20 to 70 degrees.

6. The engine block of claim 1, wherein the chamfered edges have a chamfer angle of 30 to 60 degrees.

7. The engine block of claim 1, wherein each of the chamfered edges has a chamfer length that is at most ⅓ of a maximum groove peak width.

8. The engine block of claim 1, wherein the top portion is wider than the base portion such that the groove forms an undercut with the bore surface.

\* \* \* \* \*